May 15, 1956

L. W. TOWNSEND 2,745,172

COMPOSITE ASSEMBLY FOR BONDING
PLATES OF DISSIMILAR METALS

Filed June 6, 1951

INVENTOR.
Leyshon W. Townsend

BY

HIS ATTORNEYS

United States Patent Office 2,745,172
Patented May 15, 1956

2,745,172

COMPOSITE ASSEMBLY FOR BONDING PLATES OF DISSIMILAR METALS

Leyshon W. Townsend, Washington, Pa.

Application June 6, 1951, Serial No. 230,106

6 Claims. (Cl. 29—194)

This invention relates to a method of and assembly for bonding metals together.

While the present invention is applicable to bonding together a wide variety of metals, it will be described first in connection with the bonding of stainless steel and mild steel to form a composite body having a facing of stainless steel and a backing of mild steel. In the making of such a composite article by the assembly method and according to prior practice, where a 4-ply assembly has been used, the following steps have been employed. An assembly has been formed by interposing two plates of stainless steel facing metal between two spaced-apart backing plates of mild steel, the two plates of stainless steel having a separating layer between them, as for example aluminum oxide powder suspended in a vehicle consisting of a cellulose lacquer and an organic liquid thinner. Spacer bars are placed around the periphery of the facing plates and are sealed to the backing plates to form an air-tight assembly. The assembly is then heated to bonding temperature, and while at that temperature, is forged or rolled in order to bond the backing plates to the facing plates. The assembly is then severed along its border to remove the spacer bars and the border of the backing plates from the remainder of the assembly, and the remainder of the assembly is then separated along the plane between the two plates of facing metal. In this manner, two composite bodies are produced, each consisting of a backing plate of mild steel and a facing plate of stainless steel.

In carrying out the method as described, during heating of the assembly to bonding temperature, any air or other gas entrapped in the assembly expands and tends to puff up the assembly. Sometimes the expansion of the gas within the assembly breaks the seal during heating and allows gases to enter which prevent the proper bonding of the facing plates to the backing plates. In other cases, while the expansion of the gases within the assembly during heating may not actually break the seal, this seal may be broken when the assembly first enters the mill used for pressing the plates together in order to bond them, and thus allows air to enter the assembly during the remainder of the rolling of the assembly, which entrance of air into the assembly may prevent proper bonding of the metals.

In accordance with my invention, I provide relief valves extending from the interior to the exterior of the assembly which allow escape of gas from the interior of the assembly to the exterior thereof while preventing ingress of gas into the interior of the assembly.

In the accompanying drawings which illustrate several embodiments of my invention, Figure 1 is a perspective view of a 4-ply assembly;

Figure 1:
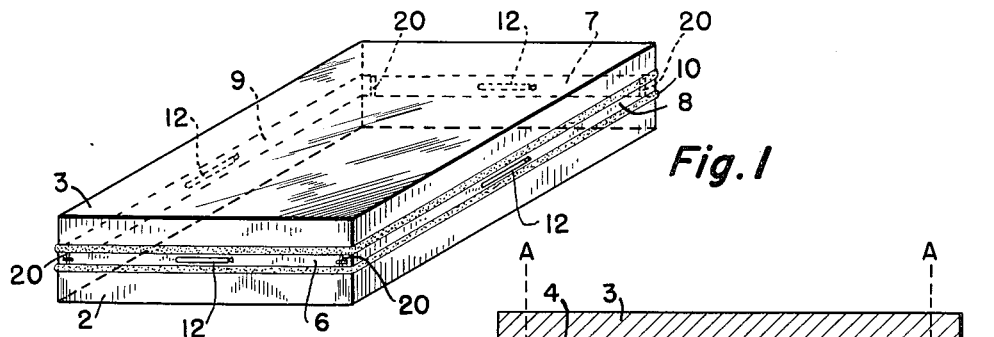
Figure 2:
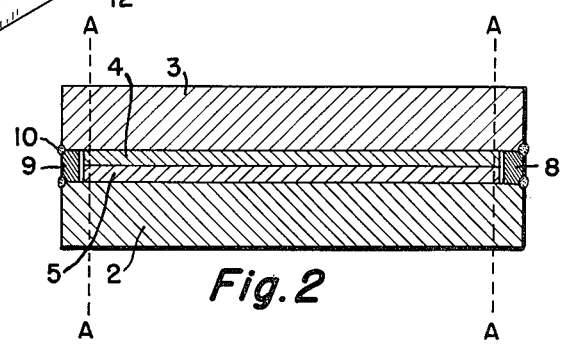
Figure 2 is an enlarged transverse vertical section taken through the assembly shown in Figure 1.

Referring more particularly to the accompanying drawings and for the present to the embodiment shown in Figures 1–4, 6 and 7, the assembly comprises a lower backing plate 2 of mild steel, and an upper backing plate 3 of mild steel. These two plates, 2 and 3, are spaced apart and two facing plates, 4 and 5, of stainless steel are interposed between them. The adjacent faces of the two facing plates 4 and 5 are separated by a separating compound which may be aluminum oxide powder suspended in a cellulose lacquer containing an organic thinner for the lacquer. In order to aid bonding of the facing plates 4 and 5 to the backing plates 3 and 2, respectively, a reducing agent such as zinc powder suspended in a vehicle consisting of cellulose lacquer and an organic thinner is applied to one or both of the bonding surfaces. End spacer bars 6 and 7 and side spacer bars 8 and 9 are placed around the periphery of the facing plates 4 and 5 and are welded to the backing plates 2 and 3 as indicated by the reference number 10.

Figure 3:
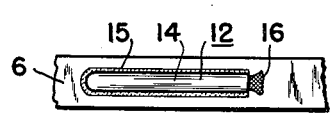
Figure 3 is an enlarged side elevation of a portion of one of the spacer bars and showing one of the relief valves.
Figure 4:
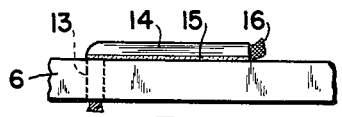
Figure 4 is a plan view of the structure shown in Figure 3.

Each of the end spacing plates 6 and 7 and each of the side spacing plates 8 and 9 may be provided with one or more relief valves indicated generally by the reference numeral 12, and illustrated more particularly in Figures 3 and 4. The relief valve comprises a pipe having a portion 13 extending through an opening in the spacer bar and a portion 14 extending along the outer surface of the spacer bar and welded thereto by welds 15. The pipe is filled with asbestos rope 16 which allows escape of gas under pressure from the interior to the exterior of the assembly, but prevents entrance of gas at atmospheric pressure into the assembly. In place of the asbestos rope, I may use any refractory material such as sand, magnesium oxide, aluminum oxide, chromium oxide, either in the form of powder or of a porous refractory body which acts as a pressure relief valve.

Figure 5:
Figure 5 is a plan view of a portion of one of the spacer bars, showing a modified form of relief valve.

Figure 5 illustrates a modified form of relief valve in which an asbestos rope bent generally into the form of a U extends through two openings 19 in the spacer bar 6.

Figure 6:
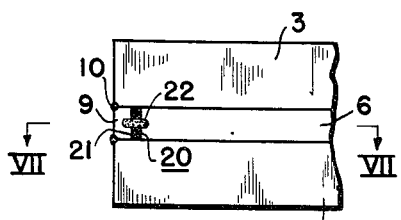
Figure 6 is an end elevation of a corner of the assembly shown in Figure 1.
Figure 7:
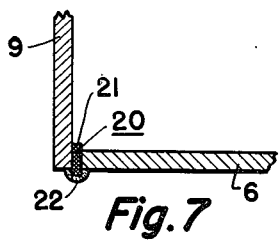
Figure 7 is a horizontal section taken on the line VII—VII of Figure 6.

In addition to or instead of the relief valves 12 in the spacer bars, I may provide relief valves 20 between the adjacent ends of the end spacer bars and side spacer bars. As shown in Figures 6 and 7, a wad of asbestos rope 21 is placed between the end of the end spacer bar 6 and the side spacer bar 9 so as to fill the space between the bottom and top backing plates 2 and 3. The wad 21 is held in place by a weld 22 extending over the outer edge of the wad and joined to the spacer bars 6 and 9.

The assembly provided with the relief valves is heated in a furnace to a temperature sufficient to bond the backing plates and facing plates when they are pressed together, the preferred bonding temperature being about 2250° F.–2300° F. The lacquer and organic thinner used in the separating layer between the facing plates 4 and 5 and the lacquer and organic thinner used in the bonding layer between the backing plates and the facing plates volatilizes and flushes out oxygen which may be contained within the assembly. The zinc powder also volatilizes. In addition, the zinc reduces any chromium oxide on the surfaces of the stainless steel facing plates to chromium, thereby permitting good bonding of the backing and facing plates. Development of any excess gas pressure within the assembly during heating is prevented by escape of gas to the atmosphere through the relief valve or valves, thereby preventing breaking of the seal of the assembly.

After the assembly has been heated to bonding temperature, it is pressed either by forging it or rolling it between rolls so as to bond the backing plates and facing plates together. During such pressing, the relief valves allow egress of gas from the assembly but prevent ingress of gas to the assembly. The border of the assembly is then removed from the remainder of the assembly by severing along lines A—A shown in Figure 2 and along corresponding lines at the ends of the assembly, and the remainder of the assembly is separated along the plane of the separating surface between the facing plates 4 and 5.

In place of using zinc powder for aiding in bonding the backing plates and facing plates together, I may use aluminum, magnesium or other reducing agents. While it is preferred to use a reducing agent between the bonding surfaces of the backing plates and facing plates, the reducing agent may be omitted in some instances and even there, the provision of the relief valves serves a useful purpose. The relief valves allow escape of air and other gases developed during heating. The heating volatilizes the lacquer and organic thinner used in the separating layer and causes the air originally entrapped in the assembly to expand, thereby resulting, when relief valves are not provided, in a tendency for the assembly to puff up and break the seal either during heating or as the assembly enters the mill. If the seal is broken, air may enter the assembly and prevent proper bonding.

Figure 8:
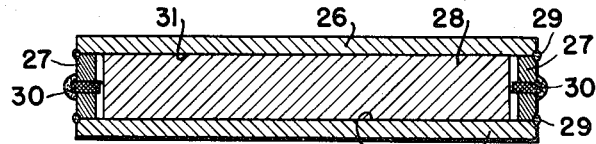
Figure 8 is a transverse vertical section of a 3-ply assembly.

Figure 8 illustrates a modified form of the invention in which the assembly is a 3-ply assembly instead of the 4-ply assembly previously described. The assembly shown in Figure 8 comprises a bottom plate 24 of stainless steel and a top plate 26 of stainless steel spaced from the bottom plate by spacer bars 27 which surround the periphery of a plate 28 of mild steel. The spacer bars are welded as at 29 to the plates 24 and 26. Relief valves 30, similar to the relief valves 12, are provided in the side and the end spacer bars as previously described and a bonding layer such as zinc powder in a vehicle consisting of a cellulose lacquer and an organic thinner is interposed between the bonding surfaces 31 and 32. After the assembly has been heated to bonding temperature and rolled or forged, it is severed along its border as previously described, thereby forming a 3-ply composite article consisting of a core 28 of mild steel clad on each of its surfaces with a cladding 24 or 26 of stainless steel.

The use of relief valves in an assembly according to my invention is not limited to any particular kinds or combinations of metals to be bonded. If stainless steel is employed, it may be of the austenitic type, as for example one containing 18% chromium and 8% nickel, or it may be of the ferritic type, as for example one containing 17% chromium. In place of mild steel, I may use medium carbon or high carbon steel, and in place of stainless steel, I may employ low, medium or high alloy steel. I may bond copper to mild steel or to stainless steel, or I may bond various other combinations of metals together in accordance with my invention.

My invention is not limited to the preferred embodiments which have been illustrated and described merely for purposes of illustration, but may be otherwise embodied or practiced within the scope of the following claims.

I claim:

1. A composite assembly for bonding plates of dissimilar metals, comprising: at least a pair of superimposed plates composed of forgeable, dissimilar metals; a reducing agent which volatilizes below the forging temperature of said plates, disposed therebetween; metal sealing means extending peripherally about and welded to said assembly and sealing the same in a substantially gas-tight welded joint; venting means extending through said sealing means from the exterior to the interior of said assembly, said venting means comprising at least one metal tube filled with a refractory packing, for limiting gaseous flow between the exterior and interior of said assembly.

2. A composite assembly according to claim 1 wherein said reducing agent is a metal, in powdered form, selected from the group consisting of zinc, magnesium and aluminum.

3. A composite assembly according to claim 2 wherein said refractory packing comprises a material selected from the group consisting of asbestos and oxides of aluminum, chromium and magnesium.

4. A composite assembly for bonding plates of dissimilar metals, comprising: a superimposed assembly consisting of a pair of outer plates of one type of metal having interposed therebetween at least one plate of another type of metal, all of said plates being composed of forgeable material; a reducing agent which volatilizes below the forging temperature of said plates, disposed between each of said outer plates and the plate contiguous thereto; sealing means, including side and end bars extending between and welded to said outer plates and also extending peripherally about said assembly, said bars being welded to each other at their abutting ends, thereby to provide a substantially gas-tight seal between the interior and exterior of said assembly; venting means extending through said sealing means from the exterior to the interior of said assembly, said venting means comprising at least one metal tube filled with a refractory packing, for limiting gaseous flow between the exterior and interior of said assembly.

5. A composite assembly according to claim 4 wherein said reducing agent is a metal, in powdered form, selected from the group consisting of zinc, magnesium and aluminum.

6. A composite assembly according to claim 5 wherein said refractory packing comprises a material selected from the group consisting of asbestos and oxides of aluminum, chromium and magnesium.

References Cited in the file of this patent

UNITED STATES PATENTS

| Number | Name | Date |
|---|---|---|
| 1,152,610 | De Bats | Sept. 7, 1915 |
| 1,886,615 | Johnson | Nov. 8, 1932 |
| 1,956,818 | Acre | May 1, 1934 |
| 2,018,725 | Johnson | Oct. 29, 1935 |
| 2,034,278 | Becket | Mar. 17, 1936 |
| 2,074,352 | Armstrong | Mar. 23, 1937 |
| 2,085,313 | Guthrie | June 29, 1937 |
| 2,133,292 | Gordon | Oct. 18, 1938 |
| 2,159,043 | Orr | May 23, 1939 |
| 2,225,868 | Huston | Dec. 24, 1940 |
| 2,280,337 | McKee | Apr. 21, 1942 |
| 2,284,504 | Wrighton | May 26, 1942 |
| 2,307,512 | Kelly | Jan. 5, 1943 |
| 2,414,510 | Doyle | Jan. 21, 1947 |
| 2,438,759 | Liebowitz | Mar. 30, 1948 |
| 2,468,206 | Keene et al. | Apr. 26, 1949 |
| 2,496,188 | Wiese | Jan. 31, 1950 |